US011327850B2

(12) United States Patent
Enakiev et al.

(10) Patent No.: US 11,327,850 B2
(45) Date of Patent: May 10, 2022

(54) SYSTEM AND METHOD FOR DISASTER RECOVERY USING APPLICATION STREAMING

(71) Applicant: Acronis International GmbH, Schaffhausen (CH)

(72) Inventors: Anton Enakiev, Moscow (RU); Vladimir Strogov, Moscow (RU); Alexey Sergeev, Moscow (RU); Serguei Beloussov, Costa del Sol (SG); Stanislav Protasov, Moscow (RU)

(73) Assignee: Acronis International GmbH, Schaffhausen (CH)

(*) Notice: Subject to any disclaimer, the term of this patent is extended or adjusted under 35 U.S.C. 154(b) by 0 days.

(21) Appl. No.: 16/872,591

(22) Filed: May 12, 2020

(65) Prior Publication Data
US 2020/0364117 A1   Nov. 19, 2020

Related U.S. Application Data

(60) Provisional application No. 62/847,540, filed on May 14, 2019.

(51) Int. Cl.
*G06F 11/00* (2006.01)
*G06F 11/14* (2006.01)
*G06F 11/07* (2006.01)

(52) U.S. Cl.
CPC ...... *G06F 11/1469* (2013.01); *G06F 11/0772* (2013.01); *G06F 11/142* (2013.01); *G06F 11/1451* (2013.01); *G06F 11/1461* (2013.01); *G06F 11/1464* (2013.01); *G06F 11/1484* (2013.01)

(58) Field of Classification Search
CPC .............. G06F 11/0772; G06F 11/142; G06F 11/1451; G06F 11/1461; G06F 11/14694; G06F 11/1469; G06F 11/1484
See application file for complete search history.

(56) References Cited

U.S. PATENT DOCUMENTS 7,246,211 B1 * 7/2007 Beloussov .......... G06F 11/1461
707/999.2
8,074,035 B1 * 12/2011 Per ...................... G06F 11/1458
711/162

(Continued)

*Primary Examiner* — Elmira Mehrmanesh
(74) *Attorney, Agent, or Firm* — ArentFox Schiff LLP; Michael Fainberg (57) ABSTRACT

Disclosed herein are systems and method for disaster recovery using application streaming. In one aspect, a method includes generating a backup image of a computing system having at least one installed application and user data. The generating involves including the user data in the backup image and actively excluding program data files of the at least one installed application from the backup image. The method includes determining an application package specifying the installed application. The application package is stored at an application streaming service. Responsive to detecting a disaster recovery event, the method further includes copying the user data from the backup image to a recovery computing instance, and executing, on the recovery computing instance, a remote application from the application streaming service based on the determined application package.

17 Claims, 4 Drawing Sheets

(56) References Cited

U.S. PATENT DOCUMENTS

| | | | | |
|---|---|---|---|---|
| 8,219,850 B1* | 7/2012 | Wang | ............... | G06F 11/1417 |
| | | | | 714/6.1 |
| 8,225,133 B1* | 7/2012 | Lyadvinsky | ........ | G06F 11/1469 |
| | | | | 714/4.11 |
| 8,645,748 B1* | 2/2014 | Chepel | ............ | G06F 11/1464 |
| | | | | 714/6.12 |
| 8,832,030 B1* | 9/2014 | Buchman | .......... | G06F 11/1451 |
| | | | | 707/650 |
| 9,846,621 B1* | 12/2017 | Mirkhelkar | ........ | G06F 11/1451 |
| 10,289,503 B2* | 5/2019 | Obara | ............. | H04N 1/00917 |
| 10,657,109 B1* | 5/2020 | Chakraborty | ........... | G06F 16/21 |
| 10,789,136 B1* | 9/2020 | Ruslyakov | ........... | G06F 3/0619 |
| 10,915,347 B1* | 2/2021 | Per | ................... | G06F 9/44505 |
| 10,956,270 B2* | 3/2021 | Redko | ................. | G06F 16/128 |
| 2012/0066485 A1* | 3/2012 | Hosea | .................... | G06F 8/61 |
| | | | | 713/2 |
| 2017/0220820 A1* | 8/2017 | Young | ............... | H04L 63/0428 |
| 2017/0286234 A1* | 10/2017 | Shulga | ................ | G06F 9/4401 |
| 2019/0004783 A1* | 1/2019 | Fernandez | ............. | G06F 9/451 |

\* cited by examiner

SYSTEM AND METHOD FOR DISASTER RECOVERY USING APPLICATION STREAMING

CROSS-REFERENCE TO RELATED APPLICATIONS

This application claims the benefit of U.S. Provisional Application No. 62/847,540, filed May 14, 2019, which is herein incorporated by reference.

FIELD OF TECHNOLOGY

The present disclosure relates generally to the field of data backup and disaster recovery, more specifically, to backup methods optimized for fast disaster recovery of critical user applications, servers, and systems.

BACKGROUND

Disaster recovery is a field within computing that relates to tools, policies, and procedures that enable recovery or continuation of vital technology, infrastructure, and systems. For example, a given disaster recovery policy may specify a recovery point objective (RPO), which is the maximum time period in which data might be lost from an information technology (IT) service due to a disruption or incident. A disaster recover policy may also specify a recovery time objective (RTO), which refers to a targeted duration of time and a service level within which a business or technological process must be restored after a disruption ("disaster") occurs in order to avoid unacceptable consequences associated with a break in business continuity.

Disaster recovery of a user's system typically consists of both recovering the user's data and recovering software applications that were installed on the user's computer, laptop, server, etc. That is, it is not enough to simply recover the user's files and documents, but rather, it may be necessary to store the work of the most important software applications found on that user's computer, laptop, or server so as to ensure business continuity. Such important software applications may include various server programs, such as Microsoft® Exchange Server, various databases, e-commerce systems, payment systems, and so forth.

One known approach for disaster recovery uses an image backup, in which a server or other computer is backed up complete, including all data found on the server, operating system, installed applications, etc. The image backup includes the most relevant state of the server or other computer, which is backed up. So, during disaster recovery, when the server is restored from the image (i.e., to the same hardware or new, different hardware), a complete copy of the initial system (at the time of the last backup of this machine) is obtained. This backup and restoration process is considered faster than completely reinstalling the system and applications from scratch, but still has drawbacks in terms of recovery time.

However, using conventional tools, the time spent to recover backup data and resume operations with a significant amount of data may exceed the recovery time objective. Recovery time can depend on a particular machine workload and on the target hardware configuration for scenarios when recovery is performed onto a different hardware platform having different types of hardware devices than the original computing hardware. A large portion of the recovery time can be spent on copying or preparing backups. Even if this recovery time may be on the order of several minutes, such a delay is still unacceptable for certain business-critical applications where the recovery time objective is high, and every minutes of server downtime can bring significant losses in lost business and money. Additionally, the efficiency of a disaster recovery process can strongly depend on how timely the actions for such recovery are performed. If such actions are delayed, there is an increased chance of data loss or an increased amount of data loss, which can be unacceptable for some critical computing systems.

In sum, there is a need in the art to minimize server downtime during backup, reduce data loss, and provide a mechanism to rapidly recover a server after a failure or shutdown.

SUMMARY

Thus, a system and method is disclosed herein for improved disaster recovery, and, more particularly, for backup methods that are optimized for a faster disaster recovery of critical user applications, servers, and systems. To address the above-described problems, the described system efficiently utilizes backup procedures with data streaming technology. This technique reduces the size of backup images by including only those files that are determined necessary for disaster recovery, as well as eliminates from the backup image all applications whose restoration is most critical. The technique also uses streaming access to these applications running on cloud storage (or any other network storage). Thus, aspects of the present disclosure are able to significantly reduce the amount of data that needs to be backed up increase According to one aspect of the present disclosure, a computer-implemented method for disaster recovery using application streaming is provided. The method includes generating a backup image of a computing system having at least one installed application and user data. The generating involves including the user data in the backup image and actively excluding program data files of the at least one installed application from the backup image. The method includes determining an application package specifying the installed application. The application package is stored at an application streaming service. Responsive to detecting a disaster recovery event, the method further includes copying the user data from the backup image to a recovery computing instance, and executing, on the recovery computing instance, a remote application from the application streaming service based on the determined application package.

In another aspect of the present disclosure, a system is provided for disaster recovery using application streaming. The system includes a storage device configured to store at least one installed application and user data, and a hardware processor communicatively coupled to the storage device. The processor is configured to generate a backup image of a computing system, and determine an application package specifying the installed application. As mentioned previously, the backup image includes the user data and excludes program data files of the installed application. The application package is stored at an application streaming service. The processor is further configured to, responsive to detecting a disaster recovery event, copy the user data from the backup image to a recovery computing instance, and execute, on the recovery computing instance, a remote application from the application streaming service based on the determined application package.

According to another exemplary aspect, a computer-readable storage medium is provided comprising instructions that comprises computer executable instructions for performing any of the methods disclosed herein.

In some aspects, the recovery computing instance is at least one of a recovery virtual machine (VM) and a hardware server.

In some aspects, the method for determining the application package specifying the installed application further comprises monitoring installation of software applications on the computing system, and responsive to detecting installation of the at least one installed application, generating the application package that includes a copy of the program data files of the installed application.

In some aspects, the method for determining the application package specifying the installed application further comprises generating the application package based on a pre-determined list of software applications known to be installed on the computing system.

In some aspects, in response to updating the at least one installed application on the computing system, the method includes updating the corresponding application package stored at the application streaming service.

In some aspects, the remote application executed on the recovery computing instance incorporates configuration files and preferences from the application package.

In some aspects, the determined application package comprises a copy of objects of an operating system of the computing system, wherein the objects include registry data, configuration files, library files, and component object model (COM) software components of the operating system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for disaster recovery using application streaming. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
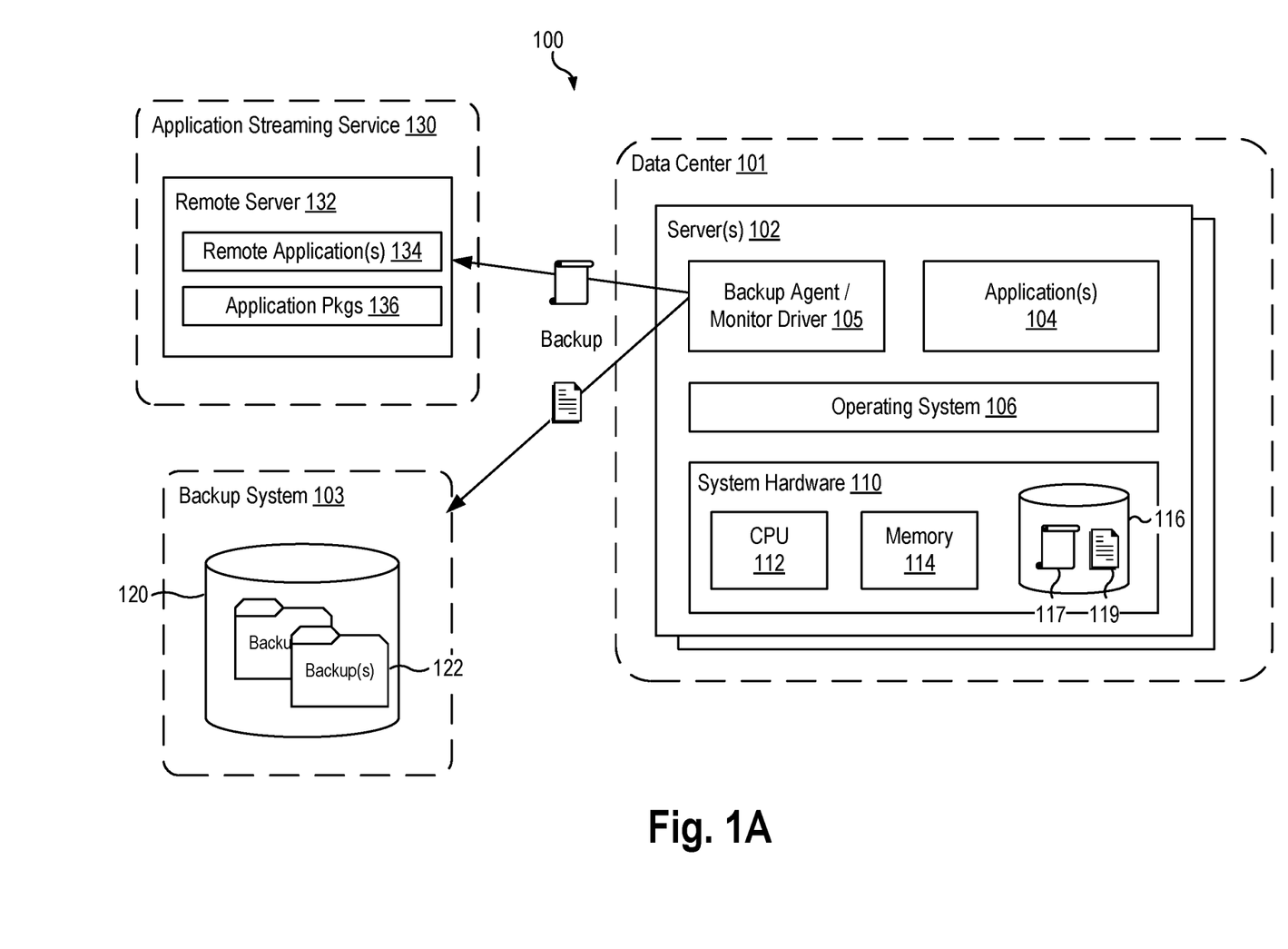
FIG. 1A is a block diagram illustrating a system configured to prepare for disaster recovery using application streaming according to an exemplary aspect.

FIG. 1A is a block diagram illustrating a system 100 configured to prepare for disaster recovery using application streaming according to an exemplary aspect. A streaming application is a program that has its necessary components downloaded on demand instead of being installed ahead of time on a computer. The system 100 includes a data center 101 having a plurality of servers 102 whose data is backed up by a backup system 103. The server(s) 102 may be any physical server, computer server, host, desktop, laptop, handheld device, tablet device, smartphone, or other suitable computing devices. As shown, the system hardware 100 of a server can include at least one computer processing unit (CPU) 112, memory 114 (e.g., random access memory), and storage devices 116 (e.g., hard disk drives). The server 102 may include additional devices, software modules, and the like, as would be appreciated to one skilled in the art, but are not shown herein so as to not unnecessarily obscure the aspects of the disclosure.

The server 102 may have at least one or more software applications 104 and an operating system 106 installed on the server. An installed application 104 is comprised of one or more program data files 117 of the application stored in a local storage drive or other data store accessible to the server 102 (e.g., network share). In addition to the program data files 117, the server 102 may store user data 119 that is created and/or owned by a user of the server 102. In some aspects, user data 119 are files or data generated and utilized by a user in the performance of one or more tasks (e.g., using applications 104), and may be stored in a home directory (e.g., "/home") or other user-privileged portion of the storage device 116. The user data 119 as used herein is distinguished from "system data," which makes up the program data files of the operating system 106 and installed software applications 104 installed on the server, and are stored in a system directory (e.g., "/usr", "/var", "C:/Program Files") or other system-privileged portion of storage. For example, user data 119 may comprise a word document (e.g., a docx file), application 104 may comprise a word editor such as Microsoft Word, and program data files 117 may include all files that are installed onto a system for Microsoft Word during an initial installation or during an update. The update may be triggered by the user who manually installs files (e.g., a plugin) or a may be automatically triggered by the application itself.

In some aspects, the user data associated with a particular application represents an execution state of that application. For example, the application 104 may have a multi-tier software architecture in which user data stored in a data layer of the multi-tier application is backed up by the backup system 103. In another example, the application 104 may be a virtual machine (VM) instance having one or more virtual disk files, which represent the state of the virtual machine, and which are backed up by the backup system 103.

In an aspect, the server(s) 102 may be executing a workload using at least one of the applications 104 within an execution environment provided by the operating system 106. In some aspects, the application 104 may be designated as a "protected" application subject to a disaster recovery policy implemented by the backup system 103. In some aspects, the entire server 102 itself is designated with a "protected" status, in which the backup system would then protect all processing performed by the server including the entire software stack of the server and user data stored therein.

According to an aspect, the system 100 includes a backup agent 105 configured to perform a backup procedure of the protected server 102 that uses data streaming technology. In an aspect, the backup agent 105 may be configured to perform a backup and archival procedure at the direction of a user (e.g., user input) or periodically according to a schedule determined by a disaster recovery policy. For example, in compliance with a policy specifying a RPO of 24 hours, the backup agent 105 may be configured to create a full backup of each server 102 every day at 2:00 AM. The backup agent 105 may be implemented as a monitor system driver executing on the server to be backed up, or in other implementations, as a service executing in a separate server that is communicatively coupled (e.g., by a network) to the server to be backed up.

The system 100 may include a recovery agent 150 configured to perform disaster recovery or failover for any applications 104 or server 102 designated as "protected" according to a pre-determined disaster recovery policy. The system 100 may include one or more backup servers for executing a recovered workload, when necessary. The backup servers may be designated prior to a failure or dynamically selected upon detection of a failure. In some aspects, the backup servers may be co-located with the servers 102 (e.g., in a same data center or site), located in a different data center or site, and/or are part of a cloud-based computing platform.

In one aspect, the backup agent 105 is configured to perform a backup procedure that separates the backup of user data stored in the server 102 from the disaster recovery preparation for the applications 104 installed on the server. As shown in FIG. 1A, the data backup is stored on a backup system 103 (e.g., data cloud/storage), while applications are prepared to be run by an application streaming service 130 (e.g., application cloud/storage). In some aspects, the data backup (which excludes application files) may be stored on a data cloud, which is designed for actively changing data and optimized for data writing speed. In contrast, the application cloud may be designed for low mutable operations and optimized for high speed data access for read operations. As described in greater detail below, application packages 136 are collected from the server 102 which is backed up (and restored then).

During disaster recovery, the applications are streamed (to the machine which is recovered) immediately after disaster recovery procedures have started. For example, a virtual machine which replaces the failed machine can be instantiated, and after the VM has started, applications may begin to be streamed from the application cloud (storage) to this recovered machine. Alternatively, a clean physical machine can be used, e.g., as a production server, without installing the applications, but rather, these applications are run remotely on this machine via an application stream process. The disaster recovery procedure is described later in greater detail in conjunction with FIG. 1B.

In an aspect, the backup agent 105 generates and stores a plurality of backups 122 of the one or more servers 102 in a data store 120 provided by the backup system 103. The backup system 103 may be any storage system having any number of storage servers or set of disks (e.g., hard disk drives), which are managed by software for archiving and storing data. The data store 120 may include one or more mass storage devices which can include, for example, flash memory, magnetic disks, optical disks, tape drives, solid-state drives, or any other type of storage medium or combination thereof. In some aspects, the backup system 103 may be a cloud-based data storage service that dynamically provides storage resources across a network.

In one aspect, the backup agent 105 may be configured to generate a backup 122 (also referred to herein as a backup archive) that includes a copy of files, folders, data, metadata, and/or information stored on a disk (e.g., storage device 116 of the server). To reduce the volume of data, the backup agent 105 is further configured to exclude from the backup all application-related files (e.g., program data files 117; executable files, DAT files, dynamic libraries, etc.) from the server. The program data files 117 may include executable files having computer-executable program code and/or instructions for an application 104; software components (e.g., COM objects or Component Object Model binary software components); shared software libraries (e.g., DLLs or dynamic-link libraries); configuration files; registry data; resources; and media library files (e.g., images, icons, sound, video associated with the application). The program data files 117 may be encoded in a text format, binary format (e.g., machine code, image data), intermediary format (e.g., Java bytecode), structured and semi-structured data formats (e.g., XML or eXtensible Markup Language; JSON or JavaScript Object Notation), unstructured data formats, other data formats, and any combination thereof.

In one aspect, a backup 122 may be a sector-by-sector copy of a disk, including a copy of the user data 119, as well as data files of the operating system 106, registry, drivers, data files of software applications 104, all files and folders (including hidden and system files), boot record, file allocation tables (FAT), other system data, but excluding application-related files (i.e., files necessary to execute a particular application 104). Such backups 122 may also be referred to as a disk image (which may further include a master boot record, or MBR) or a partition image. In some aspects, the backups 122 may be stored in a particular format for compression and/or packaging, such as a True Image Backup™ format (*.tib) made available by Acronis®, ISO images, VHD files, and other file formats. In some aspects, the backups 122 may be "full" backups having a replica of the entirety of a system disk, volume, partition, or other data storage of the server 102 (less the application-related files). In some cases, the backup agent 105 may generate incremental backups, which contains all changes that have been made since the latest incremental or full backup was created. In other cases, the backup agent 105 may generate differential backups which contain all changes that have been after a full backup creation (i.e., cannot be chained to another differential or incremental backup). The backup agent may generate a full backup based on a prior full backup and at least one incremental/differential backup by collapsing the backups into a single backup file.

In another approach to disaster recovery, the backup system may proactively begin the process of running a VM from a backup archive 122, which includes emulating a virtual disk using a backup archive. It is noted that, in order to start the guest OS on a mounted VM, restore-preparation algorithms must be executed. Applying these restore algorithms may take significant time, since the VM disks are emulated from the backup archive, and thus have limited IOPS (input/output operations per second), which further slows down application of the restore algorithms. For example, the restore-preparation process may include the addition or modification of at least one device driver in the virtual disk, the patching of a system boot loader, conversion of disks from MBR (master boot record) format to EFI (if needed). An example restore-preparation process may be Acronis Universal Restore™ technology found in Acronis Backup® made available by Acronis International GmbH. Using aspects of the present disclosure, the backup system may proactively begin the process of running a VM from a backup archive by, for example, pre-provisioning VMs and/or networks in the backup system for use in the disaster recovery.

In one aspect, the backup agent 105 may be configured to exclude program data files 117 of applications from a backup based on a determination that one or more such files matches or satisfies certain application-data-file criteria. The application-data-file criteria may specify file paths of locations of known application data files (e.g., "C:/Program Files/"), particular filenames (e.g., "*.exe"), or a combination thereof (e.g., "C:/Program Files/*/*.exe"). In some aspects, the application-data-file criteria can specify files found at a particular mount point (e.g., on Unix-based systems) should be excluded from the backup.

In addition to preparing the data backup, the backup agent may organize the data applications that will run from the application cloud. In some aspects, the backup agent may determine one or more application package 136 specifying the installed application 104, which are provided to the application streaming service 130 as part of the backup procedure. The application package 136 enables the application streaming service 130 to determine which remote application 134 (executing on a remote server 132) should be streamed to the recovery system during disaster recovery, and how that remote application should be configured so as to behave in a similar manner as the existing installed application. A variety of approaches and options are available for organizing data for applications that will run from the application streaming service 130.

In a first approach, the application streaming service 130 may be configured to have a predefined application server on the cloud, say, having a set of the most popular or frequently required applications for users, such as Microsoft® Exchange Server, or Microsoft SQL Server. These applications are installed and configured in advance such that during a disaster recovery, the recovery system selects (e.g., via user input by a system administrator) the desired application from the list (if the application was on the restored machine before the failure event). For example, the system requires that the remote application 134 be a particular version (e.g., MS Exchange 2010, with Service Pack 3). If the recovery system determines that the appropriate version of this application in the set, then this remote application 134 is streamed to the machine which is being restored (e.g., immediately after the machine has started).

In a second approach, the backup agent 105 may be configured to prepare specific application packages related to a particular server being backed-up. In an aspect, the backup agent may monitor the installation of software applications on the computing system, and responsive to detecting installation of the at least one installed application, generate an application package 136 that includes a copy of the program data files 117 of the installed application 104. For example, the system may monitor for and detect any installations of software application on this machine (e.g., using a special driver), and then create special streaming packages 136 from these installed applications 104. In this case, the composition of these packages can completely duplicate all installed applications on this machine, including all updates, patches, settings, etc., associated with the applications. After the formation of such packages, the backup agent may place the packages 136 on the application cloud (e.g., on remote server 132). In case of disaster recovery, the remote application(s) are streamed directly from the application cloud, where these packages had been placed.

More specifically, the required program data files at any given moment are transmitted by remote server 132 to server 102. For example, application 104 may be Microsoft Word. Application streaming service 130 may store a copy of the installation folder of Microsoft Word as a package 136. Subsequent to recovery, application streaming service 130 may transmit a message to server 102 indicating a plurality of applications that can be streamed and the original directory locations of the applications (on server 102 prior to recovery). In response, a client application (which may be installed immediately after recovery) of application streaming service 130 on server 102 may generate empty directories titled after the respective applications in the plurality of applications. In some aspects, a clickable icon may then be installed for each respective application that initiates the streaming when selected. For example, a client application of service 130 may create an installation directory of Microsoft Word. Upon user selection of a corresponding icon of Microsoft Word, the client application of service 130 may request program data files (e.g., installation files) on demand. In this case, the client application of service 130 may request an initial set of critical program data files to render the user interface of Microsoft Word and critical features for text visualization. As a user interacts with the streamed version of Microsoft Word, additional program data files may be transmitted from service 130 to server 102. For example, when the user selects a button to edit the font of text in a document, service 130 may transmit program data files associated with the different fonts available for selection to server 102. These program data files are saved in the created directory for Microsoft Word on server 102. Thus, when the application Microsoft Word seeks to change the font, the application can reference the respective program data files (i.e., font installation files) in the created directory and render the font menu, preview font types, edit the existing text's font, etc. It should be noted that the example of Microsoft Word is simplified. One skilled in the art will appreciate that any application's desired program data files can be streamed based on when a desired functionality of the application is evoked.

In some implementations, these application packages may comprise containerized instances made from the installed applications on the server. The packages 136 stored on the application cloud may be updated exactly as the software updates on the original machine. That is, when the backup agent detects an installed application is being updated or otherwise modified, the backup agent prepares an updated application package (e.g., full or delta) for the corresponding updated application. In this way, the application packages 136 maintain in a synchronized state with the installed applications, which during disaster recovery improves operations continuity and reduces downtimes that might be otherwise occur to patch a recovered application. In other implementations, the remote application 134 may be accessed via a web browser on server 102. For example, if application 104 is Microsoft Word, remote application 134 may be an online version of Microsoft Word accessible via a web browser (e.g., Google Chrome).

In a third approach, the described system does not use the original machine (e.g., server 102), but rather generates an application package 136 based on a pre-determined list of software applications known to be installed on the computing system. For example, all of the applications 104 installed on the machine may be known (e.g., by a management console), as well as all specific rules related to these applications (how it works, what updates and patches should be applied to this software). Based on these rules, the system may prepare the application packages in advance and use them when needed to recover the applications on the machine, where these applications worked before the failure or disaster event. This approach can be implemented using machine learning technologies, where a big volume of data is collected, and patterns are formed based on this collected data. This approach can work for different situations having a high degree of standardization, such as with large groups of the same or similarly configured computers.

Yet another approach may be used that is based on tracking of any specific applications. The backup agent may be configured to generate a package on the basis of monitoring the operation of the application with which, for example, Microsoft Exchange server works. In this approach, the backup agent in turn includes in the application package 136 only that data that is necessary for the operation of this application (based on monitoring) and does not include unnecessary data. In one example, the package formed may include only configuration files and settings, which can be incorporated into a remote application when it is streamed onto the recovery machine. In some aspects, the system may monitor the execution of a production virtual machine on the server 102. In other cases, the system may monitor or track an application. It is understood that a virtual machine may be considered a type of application itself, in some aspects.

For all of these approaches, the described system does not provide for the replication of applications, but rather uses application packages that can be created using different approaches. These packages can be stored on the (faster) application cloud, separate from user data, so in this situation application streaming can be highly efficient. Additionally, the described system advantageously reduces the amount of resources used during a data backup, which includes less computing resources to copy a data backup, less network resources needed to transfer the data backup over a network, and less storage resources to ultimately store the data backup in a backup system.

Figure 1B:
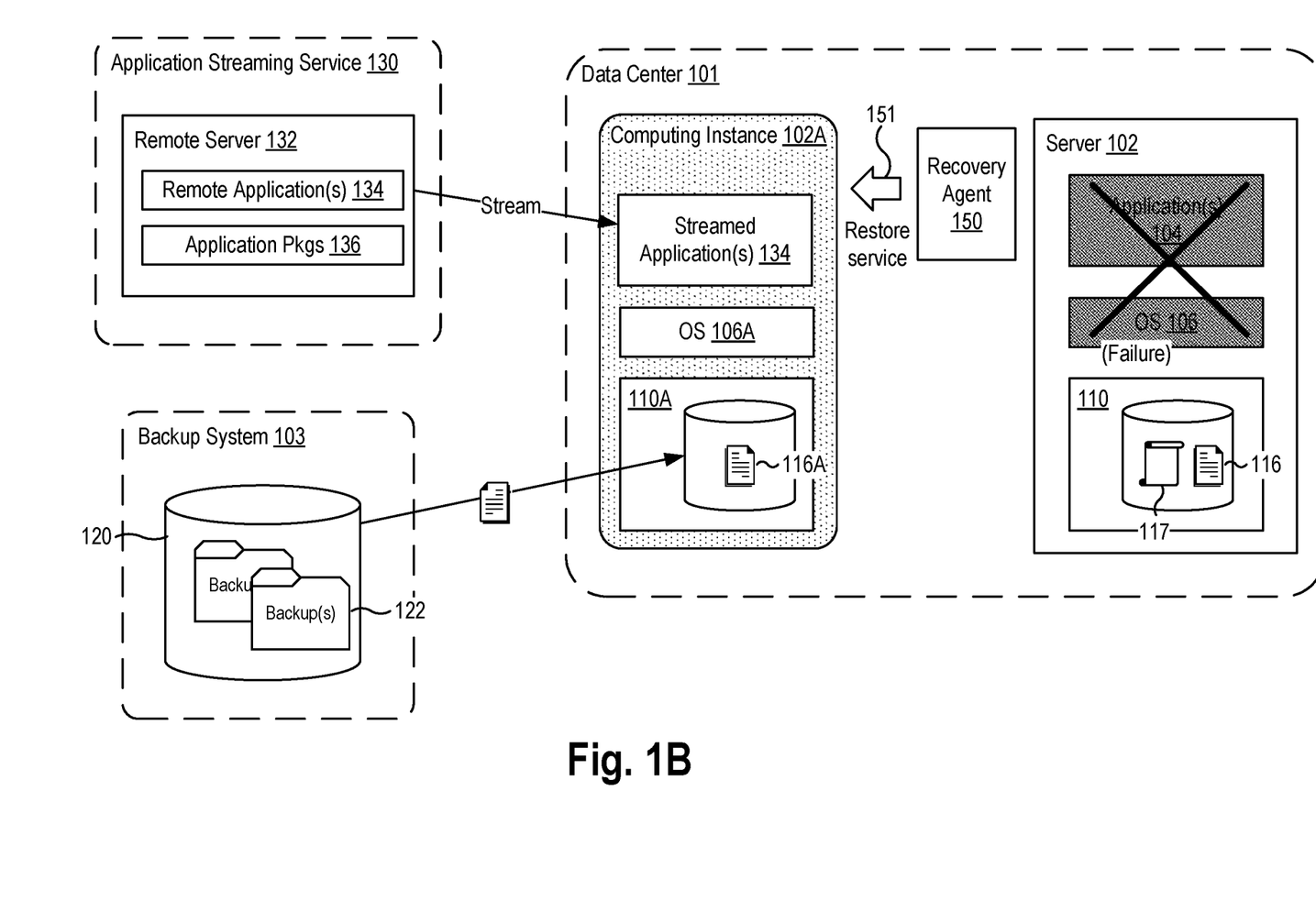
FIG. 1B is a block diagram illustrating the system of FIG. 1A during disaster recovery procedures that use application streaming, according to an exemplary aspect.

FIG. 1B is a block diagram illustrating the system of FIG. 1A during disaster recovery procedures that use application streaming, according to an exemplary aspect. In one aspect, a recovery agent 150 may be configured to (e.g., in response to a request) perform disaster recovery of the server 102 and/or of a protected application 104 executing thereon. For example, the recovery agent 150 detects that the physical server 102 has suffered a failure due to hardware issues, and automatically initiates the disaster recovery process. In another example, the recovery agent 150 may initiate the disaster recovery process in response to user input from a system management console, for example, from a system administrator.

The recovery agent 150 provisions a computing instance 102A to be used to replace the failed server 102. In one aspect, the computing instance 102A can be a virtual machine, or in other cases, a new, clean physical server different from the failed server 102. The recovery agent 150 may be configured to copy the user data from a backup image provided by the backup system 103 to the recovery computing instance 102A. Then, to recover functionality of the installed applications from the failed server, the recovery agent 150 is configured to execute, on the recovery computing instance, one or more remote application 134 from the application streaming service 130 based on the application packages 136. As such, the recovery computing instance 102A can continue executing any workloads using the streamed applications 134 executing on the copy of the (guest) operating system 106A.

In one approach to disaster recovery, one of the backups 122 is converted to a virtual machine disk (i.e., "convert to VM" approach), and then stored in the backup servers of a failover or recovery system. At the time disaster recovery procedures are initiated and the converted VM is powered on, the user data 119 that was contained in the backup 122 is immediately available. Then, the recovery agent 150 transmits a request to the application streaming service 130 that causes one or more streamed applications 134 to be available on the recovery computing instance 102A. Normally, this "convert to VM" approach uses a significant amount of storage resources because a full copy of a virtual machine disk files (e.g., VHD or VMDK files) having both user data and full replicated copies of installed applications (and all their application data files) must be maintained in storage. Aspects of the present disclosure improves this "convert to VM" approach by eliminating the storage of application data files for installed applications and therefore reducing the cost of storage resources for storing those converted VMs and the network resources and time used to transfer such a converted VM to a new server for execution.

In some aspects, a container may be used to stream applications in place of a VM. A container is an application layer abstraction that packages application code and dependencies together. A plurality of containers can run on the same machine while sharing the operating system and running individually isolated processes in user space.

Figure 2:
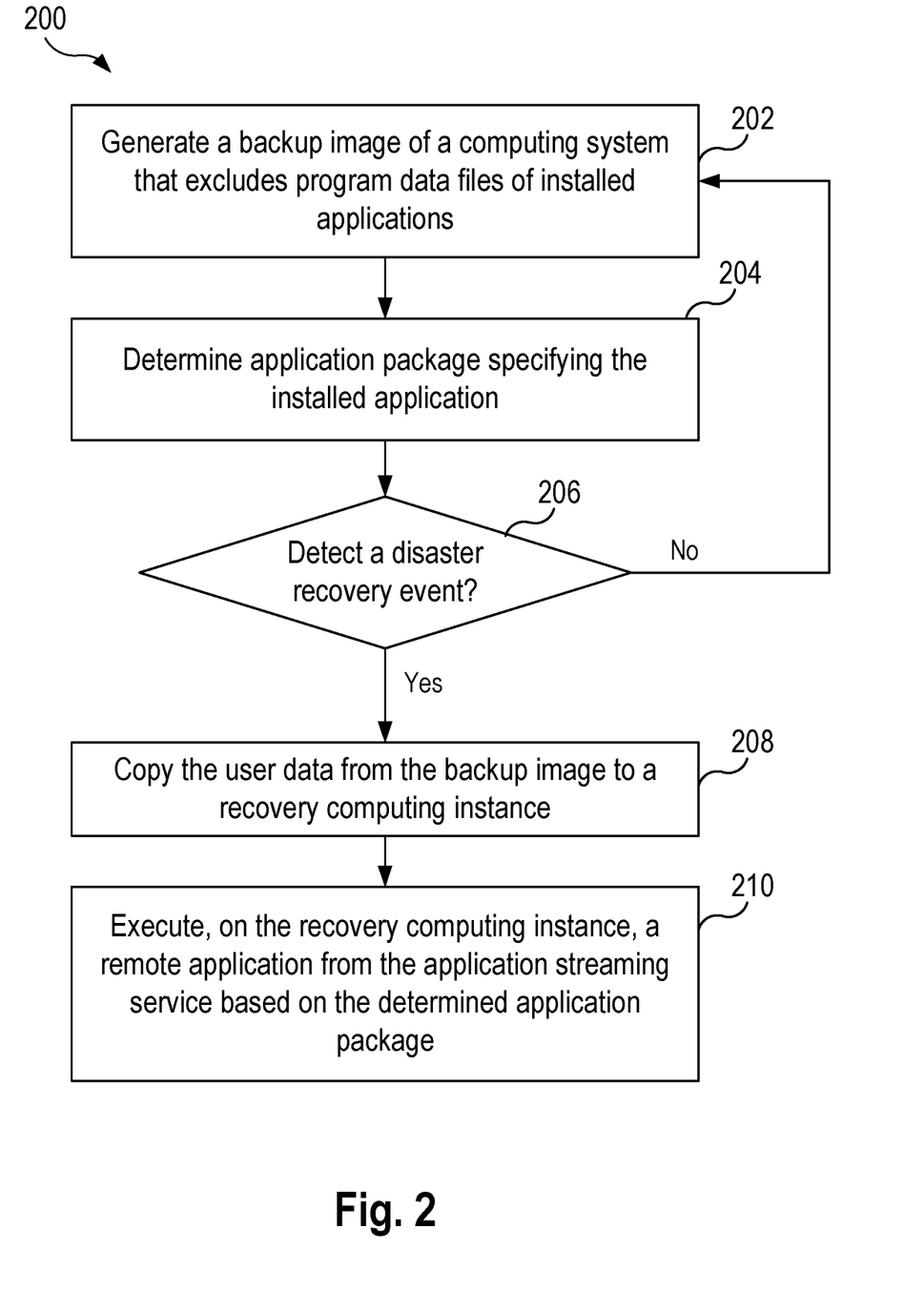
FIG. 2 is a flowchart illustrating a method for disaster recovery using application streaming according to an exemplary aspect.

FIG. 2 is a flowchart illustrating a method 200 for preparing for and performing disaster recovery using application streaming according to an exemplary aspect. It is noted that the following description of the exemplary method makes reference to the system and components described above.

The method 200 begins at step 202, in which the backup agent 105 generates a backup image 122 of a computing system 102 having at least one installed application 104 and user data 119. The backup image includes the user data and excludes program data files 117 of the installed application.

At step 204, the backup agent 105 determines an application package 136 specifying the installed application. This application package may be stored at an application streaming service 130. In some aspects, the application package comprises a copy of objects of an operating system of the computing system, wherein the objects include registry data, configuration files, library files, component object model (COM) software components of the operating system.

In some aspects, the application package 136 may be determined by monitoring installation of software applications on the computing system, and responsive to detecting installation of the at least one installed application, generating the application package that includes a copy of the program data files of the installed application. In other aspects, the application package 136 may be generated based on a pre-determined list of software applications known to be installed on the computing system. In some aspects, the backup agent may continue to monitor the state of applications installed on the computing system, and in response to updating the at least one installed application on the computing system, may update the corresponding application package stored at the application streaming service.

At step 206, the recovery agent 150 determines whether a disaster recovery event has been detected. For example, the disaster recovery event may be triggered by a hardware or software failure of one or more components of the server 102 in the data center 101. In other examples, the disaster recover event may be triggered by the absence of a heartbeat signal from one or more components of the server 102. If so detected, the recovery agent 150 initiates a disaster recovery procedure, in which, at step 208, the recovery agent copies the user data from the backup image to a recovery computing instance 102A. In some aspects, the recovery computing instance is at least one of a recovery virtual machine (VM) and a hardware server. At step 210, the recovery agent executes, on the recovery computing instance, a remote application from the application streaming service based on the determined application package. In some aspects, the remote application executed on the recovery computing instance incorporates configuration files and preferences from the application package.

Figure 3:
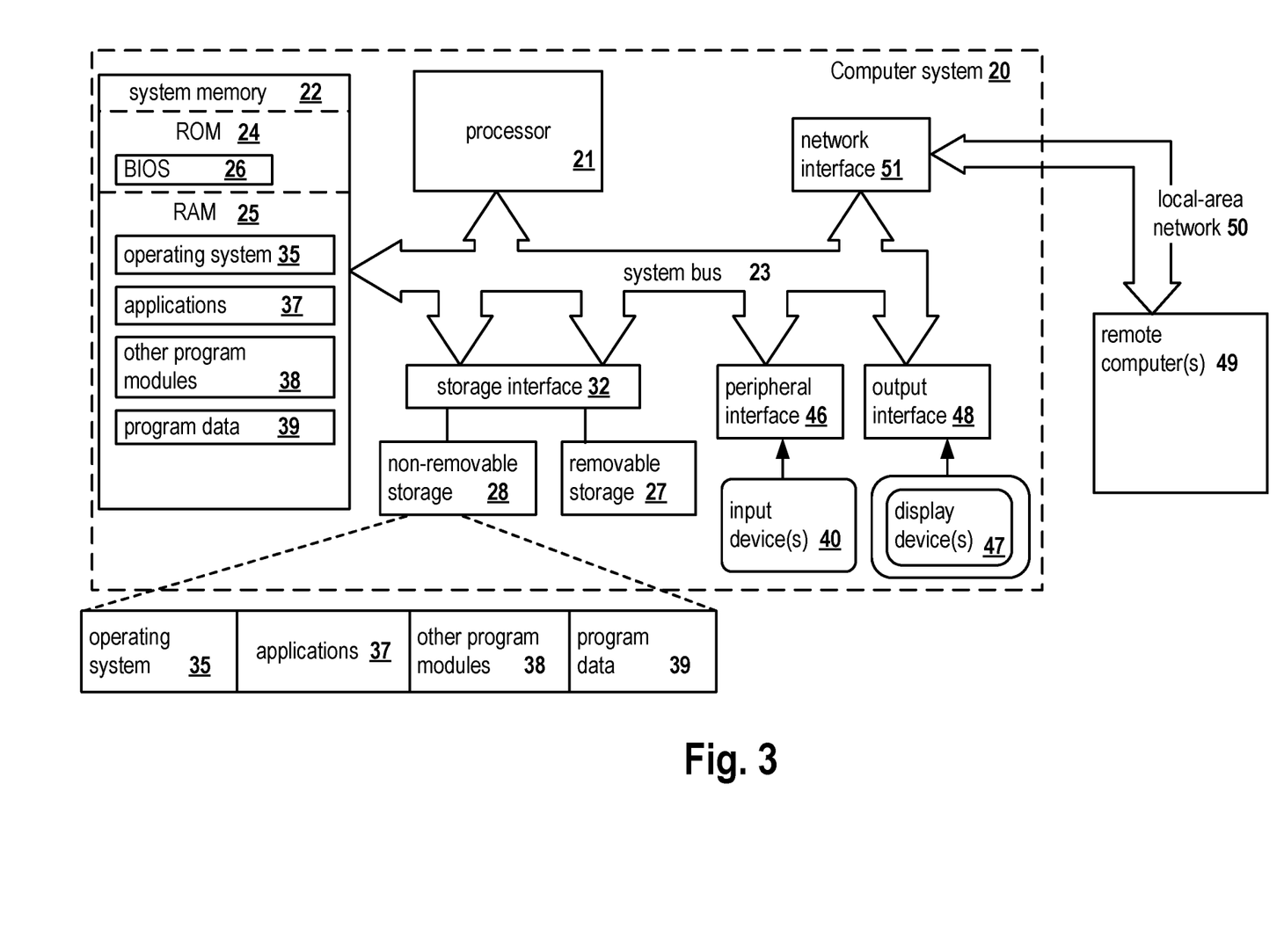
FIG. 3 is a block diagram of a computer system on which the disclosed system and method can be implemented according to an exemplary aspect.

FIG. 3 is a block diagram illustrating a computer system 20 on which aspects of systems and methods for performing disaster recovery using application streaming may be implemented in accordance with an exemplary aspect. It should be noted that the computer system 20 can correspond to the physical servers 102 and backup system 103, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for disaster recovery using application streaming, comprising:
   generating a backup image of a computing system having at least one installed application and user data, wherein the generating comprises including the user data and excluding program data files of the at least one installed application in the backup image;
   determining an application package specifying the installed application, wherein the application package is stored at an application streaming service;
   in response to detecting an update of the at least one installed application on the computing system, updating the corresponding application package stored at the application streaming service; and
   responsive to detecting a disaster recovery event:
      copying the user data from the backup image to a recovery computing instance, and
      executing, on the recovery computing instance, a remote application from the application streaming service based on the determined application package.

2. The method of claim 1, wherein the recovery computing instance is at least one of a recovery virtual machine (VM) and a hardware server.

3. The method of claim 1, wherein determining the application package specifying the installed application further comprises:
   monitoring installation of software applications on the computing system; and responsive to detecting installation of the at least one installed application, generating the application package that includes a copy of the program data files of the installed application.

4. The method of claim 1, wherein determining the application package specifying the installed application further comprises:
generating the application package based on a pre-determined list of software applications known to be installed on the computing system.

5. The method of claim 1, wherein the remote application executed on the recovery computing instance incorporates configuration files and preferences from the application package.

6. The method of claim 1, wherein the determined application package comprises a copy of objects of an operating system of the computing system, wherein the objects include registry data, configuration files, library files, and component object model (COM) software components of the operating system.

7. A system for disaster recovery using application streaming, comprising:
a storage device configured to store at least one installed application and user data;
a hardware processor communicatively coupled to the storage device and configured to
generate a backup image of a computing system, wherein the generating comprises including the user data and excluding program data files of the at least one installed application in the backup image;
determine an application package specifying the installed application, wherein the application package is stored at an application streaming service;
in response to detecting an update of the at least one installed application on the computing system, update the corresponding application package stored at the application streaming service; and
responsive to detecting a disaster recovery event:
copy the user data from the backup image to a recovery computing instance, and
execute, on the recovery computing instance, a remote application from the application streaming service based on the determined application package.

8. The system of claim 7, wherein the recovery computing instance is at least one of a recovery virtual machine (VM) and a hardware server.

9. The system of claim 7, wherein the processor configured to determine the application package specifying the installed application is further configured to:
monitor installation of software applications on the computing system; and
responsive to detecting installation of the at least one installed application, generate the application package that includes a copy of the program data files of the installed application.

10. The system of claim 7, wherein the processor configured to determine the application package specifying the installed application is further configured to:
generate the application package based on a pre-determined list of software applications known to be installed on the computing system.

11. The system of claim 7, wherein the remote application executed on the recovery computing instance incorporates configuration files and preferences from the application package.

12. The system of claim 7, wherein the determined application package comprises a copy of objects of an operating system of the computing system, wherein the objects include registry data, configuration files, library files, and component object model (COM) software components of the operating system.

13. A non-transitory computer readable medium comprising computer executable instructions for disaster recovery using application streaming, including instructions for
generating a backup image of a computing system having at least one installed application and user data, wherein the generating comprises including the user data and excluding program data files of the at least one installed application in the backup image;
determining an application package specifying the installed application, wherein the application package is stored at an application streaming service;
in response to detecting an update of the at least one installed application on the computing system, updating the corresponding application package stored at the application streaming service; and
responsive to detecting a disaster recovery event:
copying the user data from the backup image to a recovery computing instance, and
executing, on the recovery computing instance, a remote application from the application streaming service based on the determined application package.

14. The non-transitory computer readable medium of claim 13, wherein the instructions for determining the application package specifying the installed application further comprise instructions for:
monitoring installation of software applications on the computing system; and
responsive to detecting installation of the at least one installed application, generating the application package that includes a copy of the program data files of the installed application.

15. The non-transitory computer readable medium of claim 13, wherein the instructions for determining the application package specifying the installed application further comprise instructions for:
generating the application package based on a pre-determined list of software applications known to be installed on the computing system.

16. The non-transitory computer readable medium of claim 13, wherein the remote application executed on the recovery computing instance incorporates configuration files and preferences from the application package.

17. The non-transitory computer readable medium of claim 13, wherein the determined application package comprises a copy of objects of an operating system of the computing system, wherein the objects include registry data, configuration files, library files, component object model (COM) software components of the operating system.

* * * * *